2,942,986
PROCESS FOR TREATING FRESH MEATS

Beverly E. Williams, Hillsborough, Calif., assignor to Chas. Pfizer & Co., Inc., New York, N.Y., a corporation of Delaware No Drawing. Filed Oct. 4, 1956, Ser. No. 613,838

4 Claims. (Cl. 99—174)

This invention relates to the treatment of meat and has particular reference to a process for the preservation of fresh meat and to the products obtained by this process.

One of the principal objects of this invention is to provide a novel process for producing fresh (unfrozen) pre-packaged meats. Another object of this invention is to provide pre-packaged meats which remain fresh for extremely long periods under above-freezing conditions. A further object of this invention is to provide pre-packaged meats having enhanced tenderness and flavor as well as excellent keeping qualities in the unfrozen state. Still another object of this invention is the preparation of fresh, pre-packaged meats by a process which is quick, involving no long aging periods, and which is inexpensive when carried out on a quantity basis. Other objects and advantages of this invention will be readily apparent from the following detailed description of certain preferred embodiments thereof.

It is known that foods, such as meats, can be maintained in a fresh condition for reasonably long periods of time without refrigeration, by treatment with antibiotics. Such treatment may be effected by dipping the meat in brine, water or other conventional meat-processing solutions, which contain the antibiotic dissolved or suspended therein. Alternatively, the meat may be sprayed with such a solution, or sprinkled with a dry antibiotic-containing powder, or in general contacted with the antibiotic by any means known in the art. A preferred method of contact is intraperitoneal injection of the animal, a few hours prior to slaughter, with a solution of the antibiotic in an injectable menstruum like physiological saline. The vascular system of the animal itself then insures distribution of the antibiotic throughout the carcass. The same general effect can be achieved, although usually less economically, by pumping the preserving agent under pressure into the vascular system of the slaughtered carcass.

The antibiotic treatment delays the usual spoilage of the fresh meat by destroying the spoilage-causing bacteria which naturally occur in foods. While this treatment is effective in killing the bacteria, it has little or no effect upon surface spoilage caused by bacteria getting onto the meat from the air, hands of workers, cutting and processing equipment such as knives, etc. Accordingly, antibiotics have not heretofore been successfully applied in the production of fresh, pre-packaged meat cuts, but only in the handling of whole carcasses. Briefly, the present invention is directed to a novel manner of utilizing antibiotics in the production of fresh, pre-cut, pre-packaged meats.

It has been discovered that, while the anti-biotics, particularly when administered by the injection or inoculation technique, effectively destroy the spoilage-causing bacteria, they have no effect upon the formation of molds in the meat. In fact, the bacteria are natural mold antagonists and hence the removal of the bacteria enhances the mold growth. In addition it has been found that, although the formation of molds upon the surfaces of cut meats is objectionable from the standpoint of appearance and sales appeal, the presence of molds (such as the mold Thamnidium) within the meat is highly desirable because it contributes to the flavor, and to some degree the tenderness, of the meat and gives it, especially beef, the aged or walnut odor and flavor which is most sought by connoisseurs. Accordingly, this invention has a further particular advantage in that it avoids the use of mycocidal or antimycotic agents to kill or retard the growth of molds. Instead, it permits a high temperature aging treatment to promote tenderness, and the use of a surface-protective material to inhibit the objectionable surface-formation of the molds and discoloration due to oxidative changes.

Heretofore it has not been possible to use an air-tight packaging material in the packaging of pre-cut fresh meat. If fresh meat, especially moist red meat, were not permitted to "breathe," it would soon become slimy due to thriving of the bacteria on the surface, causing breakdown and spoilage of the surface meat. Thus, it has heretofore been necessary to utilize as the packaging material a breather film having a high moisture vapor transfer rate in order to permit the air to enter and partially oxidize and dehydrate the surface, thus holding down the development of slime-forming bacteria. Through use of the present invention, however, the antibiotic inoculation permits the use of a moisture vapor-tight covering or film.

Briefly, then, the process of the present invention comprises first treating the animal, either before or after slaughter, with an antibiotic such as oxytetracycline, chlortetracycline, tetracycline, chlormycetin, streptomycin, penicillin, or others, then holding the meat for several days at an elevated temperature (but below incipient cooking temperature of 120° F.), to age the same, cooling the meat, cutting it into conventional cuts, and then packaging it in a substantially air-tight film material.

Broad spectrum antibiotics like oxytetracycline are preferred, because they are effective against many Gram-positive and Gram-negative bacteria, both aerobic and anaerobic, such as Salmonella, Micrococci and Clostridia. Oxytetracycline is fairly stable at low and room temperatures but decomposes with relative ease at temperatures used in cooking. The antibiotics may be used in any of their known, antibacterially active forms, such as the base or acid per se or salts. For instance, the tetracycline antibiotics (oxytetracycline, chlortetracycline and tetracycline) may be used as the free, amphoteric compounds, as the hydrochlorides, sulfates and other acid salts, or as the sodium, potassium and other metal salts. Penicillin is preferably employed as one of its metal or organic base salts. Streptomycin or its chloride salts; or its derivative, dihydrostreptomycin, and its salts may be utilized. Generally the amount of antibiotic required in relation to the weight of the meat is very small. For instance, by the intraperitoneal injection method from 1–10 mg. of oxytetracycline per pound is sufficient, while normally 2–5 mg. per pound is preferred. Similar proportions are utilized in the spraying, dipping and other techniques.

In the heat-aging step the length of time at which the meat is held at the elevated temperature, and the degree of elevation of the temperature, are interdependent. Thus, generally the higher the temperature the shorter the time involved. However, as aforesaid it must be borne in mind that the temperature should not be so high as to involve cooking of the meat. A preferred temperature range is substantially between 70° and 118° F., the meat being held in this range for from about one to four days. It has been found most desirable from the economic standpoint to employ a temperature of about 80° F. for a period of about three days.

In the cooling step the temperature should not, of course, go below freezing for any appreciable period of time. Generally the meat is chilled to between 34° and 50° F., while the lower temperatures in this range, e.g. 34°, are preferred.

Following are specific examples of this invention, but it is to be understood that they are given by way of illustration only and not in limitation of the invention.

*Example I*

Beef cattle to be inoculated were passed in single file through a station wherein barriers were dropped in front of and behind them momentarily to prevent further movement. A veterinarian (although other trained personnel may be used) injected each cattle in its right intraperitoneal cavity with oxytetracycline at a dose rate of 2 mg. per pound of live weight of the cattle. (The paralumbar fossa on the animal's right side is the preferred site of injection. There is danger of injecting the antibiotic into the rumen on the left side and antibiotic absorption from the rumen is unsatisfactory.) A 1000-pound steer thus received a shot of 2 gm. at a cost of about 80 cents. The dosage formulation consisted of 1 gram of oxytetracycline as the hydrochloride in 50 milliliters of sterile distilled water. The membrane and soft tissues of the intraperitoneal cavity immediately absorb the injection and pass it into the blood stream through which it is circulated to even the most minute tissues of the entire animal. It has been found that the tissue level of oxytetracycline is at its highest at from 1 to 4 hours after injection and hence the cattle should be killed within this time. Accordingly, here the cattle were killed 1 to 2 hours after injection.

While post-mortem infusion of the animals could have been utilized, the ante-mortem inoculation described is preferred, since it avoids the use of special pressure pumping equipment for dissemination of the antibiotic and utilizes the heart, nature's pump, for efficient and effective distribution.

The beef carcasses were placed in a room at a temperature of 80° F. immediately after slaughter and there allowed to age at that temperature for three days. The carcasses were then chilled to about 34° F. and cut into steaks and other cuts. The cuts were then packaged either by wrapping in a preformed film or by dipping or spraying with a film-forming material of suitable nature. In either case a film is preferred which adheres closely to the cut and does not permit the transmittal of molds or mold spores through the film. It is also preferred that the film be not highly pervious to moisture, since this would permit undesirable desiccation of the cuts. The film may be transparent or opaque, and must of course be of low toxicity. A variety of materials may be used for this purpose including polyethylene films, polyvinyl chloride films and non-moisture proof cellophane, which are wrapped around the cuts. Materials which may be used for the formation of a film on the cuts by spraying or dipping include low methoxyl pectins, calcium alignates and other non-toxic or edible of this type. If desired, the cuts may be packed in a gas impervious film in an inert gas mixture such as a combustion product containing about 90% nitrogen and about 10% carbon dioxide with less than 1% carbon monoxide. Carboxymethylcellulose is a film-forming material which may also be applied by spraying or dipping.

This packaged meat was bright in color and extremely tender and flavorful. The air-tight packaging prevented oxidation and dehydration at the meat surface, as well as objectionable mold formation thereon, and the pre-cut, pre-packaged meat could be kept in this fresh condition for many weeks under ordinary (above freezing) refrigeration.

The high-temperature, short-period aging process is possible because of the antibiotic treatment step which, as indicated, inhibits the bacteria but permits the molds and enzymes to have their tenderizing and flavor-enhancing effect. Ultra-violet ozone producing lamps, of 2527 angstrom units or strong Uviac lamps may be used to inhibit surface mold growth during the aging period.

*Example II*

Beef cattle were inoculated with 2 mg. of tetracycline per pound of live body weight. The dosage form here constituted 20 mg. of tetracycline per ml. of sterile distilled water. The animals were slaughtered about 2 hours after injection and the carcasses were immediately placed in a room at 118° F. Rigor mortis set in immediately, greatly hastening the aging process. The meat was then held at this temperature for about 24 hours. The meat was cooled, cut and packaged as described above. These cuts were exceptionally tender and remained fresh and excellent in appearance for many weeks.

*Example III*

Hogs were injected with an antibiotic solution in the right lateral surface about 3 inches dorsal to and 3 inches anterior to the flank skin fold. The dosage given constituted 5 mg. of chlortetracycline per pound of live body weight. Two hours later the animals were slaughtered and then aged, chilled and packaged as described in Example I. The packaged cuts remained fresh in fact and in appearance for several weeks when stored at 40° F.

While the term "air tight" is used herein to describe the packaging of the meat cuts, it should be pointed out that this is only a relative term, inasmuch as it would be virtually impossible to obtain an absolutely positive gas or vapor barrier in a packaging film material. It is sufficient that the packaging material be in intimate contact with the meat surfaces so that there are no air spaces between the meat surface and the packaging material. In this condition, even a somewhat air-pervious material is satisfactory since the pressures from within will prevent any passage of air or moisture from the atmosphere into the package, and it is to be understood that the term "air tight" as used herein is intended to include such a package. Thus, film-forming materials such as carboxymethylcellulose may be used, in addition to those described above.

Having fully described the invention, it is to be understood that the same is not limited to the details set forth, but is of the scope set forth in the appended claims.

What is claimed is:

1. A process for treating fresh meats which comprises injecting a live animal with a tetracycline antibiotic, within about 1 to 4 hours thereafter slaughtering the animal, aging the carcass at an elevated temperature between about 70° and 118° F. for from 1 to 4 days, cooling the carcass to a temperature between about 34° and 50° F., cutting the carcass into individual cuts, and wrapping the cuts in an air-tight packaging material.

2. A process for treating fresh meats which comprises injecting a live animal with oxytetracycline, within about 1 to 4 hours thereafter slaughtering the animal, aging the carcass at an elevated temperature between about 70° and 118° F. for from 1 to 4 days, cooling the carcass to a temperature between about 34° and 50° F., cutting the carcass into individual cuts, and encasing the cuts in an air-tight packaging material.

3. A process for treating fresh meats which comprises injecting a live animal with chlortetracycline, within about 1 to 4 hours thereafter slaughtering the animal, aging the carcass at an elevated temperature between about 70° and 118° F. for from 1 to 4 days, cooling the carcass to a temperature between 34° and 50° F., cutting the carcass into individual cuts, and encasing the cuts in an air-tight packaging material.

4. A process for treating fresh meats which comprises injecting a live animal with tetracycline, within about 1 to 4 hours thereafter slaughtering the animal, aging the carass at an elevated temperature between about 70° and 118° F. for from 1 to 4 days, cooling the carcass to a temperature between about 34° and 50° F., cutting the carcass into individual cuts, and encasing the cuts in an air-tight packaging material.

References Cited in the file of this patent

UNITED STATES PATENTS

| | | |
|---|---|---|
| 2,462,760 | Mitchell et al. | Feb. 22, 1949 |
| 2,494,024 | Williams | Jan. 10, 1950 |
| 2,558,042 | Cornwell | June 26, 1951 |
| 2,585,501 | Rusoff et al. | Feb. 12, 1952 |
| 2,623,826 | Grinstead | Dec. 30, 1952 |
| 2,713,002 | Williams | July 12, 1955 |
| 2,786,768 | Deatherage | Mar. 26, 1957 |

OTHER REFERENCES

Food Technology, Dec. 1953, pp. 495 to 499, inclusive, article entitled Observations on Fresh Meat Processed by the Infusion of Antibiotics, by H. H. Weiser et al.

Food Engineering, Jan. 1956, pp. 43 to 48, inclusive, and page 194, article entitled, Antibiotic Introduced as Spoilage Inhibitor for Fresh Poultry.